United States Patent [19]

Slobodyanik

[11] 4,238,426
[45] Dec. 9, 1980

[54] CENTRIFUGAL-WHIRLING CONTACT TRAY

[76] Inventor: Ivan P. Slobodyanik, ulitsa Gagarina, 87, kv. 15, Krasnodar, U.S.S.R.

[21] Appl. No.: 62,124

[22] Filed: Jul. 30, 1979

[51] Int. Cl.³ .............................................. B01D 3/22
[52] U.S. Cl. ............................ 261/114 JP; 202/158; 261/114 R
[58] Field of Search .......... 261/79 A, 97, 110, 114 R, 261/114 JP, DIG. 44; 202/158; 422/310

[56] References Cited

U.S. PATENT DOCUMENTS

| | | | |
|---|---|---|---|
| 3,338,566 | 8/1967 | Kittel | 261/114 JP |
| 3,364,988 | 1/1968 | Hartmann | 261/114 JP |
| 3,784,175 | 1/1974 | Hirao et al. | 261/114 R |
| 4,036,917 | 7/1977 | Slobodyanik | 261/114 JP |
| 4,065,528 | 12/1977 | Slobodyanik | 261/114 R |
| 4,151,232 | 4/1979 | Slobodyanik | 261/114 R |

FOREIGN PATENT DOCUMENTS

| | | | |
|---|---|---|---|
| 174048 | 7/1952 | Austria | 261/114JP |
| 518215 | 3/1953 | Belgium | 261/114 JP |
| 613550 | 11/1926 | France | 261/114 JP |
| 682721 | 11/1952 | United Kingdom | 261/114 JP |

*Primary Examiner*—Richard L. Chiesa
*Attorney, Agent, or Firm*—Lackenbach, Lilling & Siegel

[57] ABSTRACT

The present invention relates to equipment designed for carrying out heat- and mass transfer processes between gas or vapor and liquid and deals with centrifugal-whirling contact trays installed in rectification, absorption, washing and contact vertical columns in which liquid moves in a downward direction and contacts gas or vapor rising upwards along the column, the liquid phase containing the solid phase or polymerization products.

12 Claims, 18 Drawing Figures

CENTRIFUGAL-WHIRLING CONTACT TRAY

FIELD OF THE INVENTION

The herein disclosed centrifugal-whirling contact tray for heat- and mass transfer processes between gas or vapor and liquid, to be installed in mass-transfer columns, comprises a horizontally extending round plate, a circular hydroseal made of two concentric cylindrical rings placed at some distance from the plane of the round plate, said distance increasing towards the outer one of the rings, arched slots for the passage of gas or vapor provided in the round plate outside of the circular hydroseal projection towards the periphery, said slots having tangentially directed axes and arranged in concentric circles relative to the center of the circular hydroseal, Archimedean spiral-shaped curvilinear plates vertically mounted on the round plate, diverging from the center of the circular hydroseal and bent towards the gas or vapor outlet from the arches slots, an overflow device for the transfer of liquid from the top tray of the column to the bottom one, said device located on the periphery of the round plate and having an overflow pocket and at least one discharge pipe communicating the overflow pocket with the circular hydroseal. According to the invention, the overflow pocket is defined by a cylindrical wall, a foundation secured horizontally in the column wall, and two inclined planes symmetrical with respect to a vertical plane extending through the axis of symmetry of the round plate of the tray, the line of intersection of said planes being directed towards the column axis, and has a cross-section diverging in the direction of flow of liquid being discharged, the center of the circular hydroseal being shifted towards the center of the round plate of the tray through 0.05–0.1 diameter of the tray whose radius is in the zone of quadrant of its circle located in the direction of two-phase flow rotation after a quadrant accomodating a half of the overflow pocket.

The present invention relates to equipment for carrying out heat- and mass transfer processes between gas or vapor and liquid and, more particularly, it relates to centrifugal-whirling contact trays mounted in rectification, absorption, washing and contact vertical columns wherein liquid moves in a downward direction and contacts gas or vapor rising upwards along the column, the liquid phase containing the solid phase or polymerization products.

The herein disclosed invention can be used most expediently for carrying out the processes of rectification, absorption and washing of gases in columns having a diameter of 3 to 4 m wherein very high specific loads are to be provided as regards the liquid, such as 100 $m^3/m^2h$ and over (extractive rectification), with the liquid phase containing solid particles or polymerization products.

In addition, the present invention can be used to advantage in columns having a diameter of 5 to 7 m wherein an effective contact is required between very large volumes of gas or vapor and very small amounts of liquid (vacuum rectification and sanitary cleaning of industrial gas discharges from noxious impurities) while the liquid phase contains solid particles or polymerization products.

DESCRIPTION OF THE PRIOR ART

There is known in the art a tray for use in distillation columns and scrubbers (cf., British Pat. No. 682,721), having inclined holes for the upward passage of vapor or gas to a layer of liquid held on the tray. The holes are shaped as slots and their rows extend radially such that the vapor or gas leaves the slots tangentially to the vertical axis of the column and at a slight angle to the tray surface, and imparts uniform rotational motion to the liquid on the tray. Provided in the center of the tray is a receiving sleeve with a dead-end bottom for receiving the liquid from the overlying tray, while in its peripheral portion the tray has a circular groove for the overflow of liquid to the underlying tray. The overflow lips have a toothed shape to ensure the minimum and uniform level of liquid on the tray.

Sunk in the receiving sleeve located in the center of the tray are bottom ends of discharge pipes for the overflow of liquid from the overlying tray and for providing a hydroseal such that there is always liquid in the receiving sleeve and a stagnant zone is formed where solid particles or polymerization products may remain. Such trays mounted one below another in a distillation column or scrubber provide for the contact of vapor or gas moving upwards along the column with liquid flowing downwards.

The prior art tray operates in the following manner.

The liquid is supplied via discharge pipes from the top tray to the central receiving sleeve filled with liquid for providing a hydroseal in which the bottom ends of discharge pipes are sunk. Over the upper lip of the receiving sleeve, the liquid flows to the tray where it is caused by vapor or gas leaving through the included tray holes to perform rotational motion about the column axis and move from the center to periphery, while contacting with gas or vapor, and flows over to the peripheral circular groove from which it is drained via drainage pipes to the receiving sleeve of the underlying tray. The vapor or gas passes through the holes in the tray directed tangentially to the column axis and at a slight angle to the tray surface, into the layer of liquid held on the tray and imparts uniform rotational motion to the liquid. Therefore, a contact between vapor or gas and liquid is ensured on each tray. As seen, there is always liquid in the central receiving sleeve, as a result of which a stagnant zone is formed, which prevents one from using thermally unstable or polymerizable liquids or those containing solid particles. In addition, the liquid from the receiving sleeve flows over the latter's edge and loses kinetic energy it possessed upon leaving the discharge pipes, therefore, under conditions of high loads with respect to liquid, there forms on the tray a gradient of the liquid layer height in a radial direction which makes for a non-uniform distribution of liquid over the tray cross-section and, as a result, brings about a non-uniform distribution of vapor or gas over the tray cross-section and a sharp decrease of mass transfer efficiency of the contact tray (Murphree efficiency). In the case of high liquid loads in columns of large diameters of over 2–3 m, a large number of discharge pipes will be required overlapping the column cross-section and calling for a high metal consumption. At high vapor or gas velocities, the rate of liquid rotation on the tray increases and, as a result, there decreases the time of contact of liquid with vapor or gas, which brings about a lower efficiency of mass transfer in the contact tray.

There is also known a centrifugal-whirling contact tray for carrying out heat- and mass transfer processes between gas or vapor and liquid (cf., U.S. Pat. No. 4,065,528), comprising a horizontally extending round plate, arched slots for the passage of gas or vapor provided in the round plate outside of the circular hydroseal projection on the plate, said slots having tangentially directed axes and arranged in concentric circles relative to the circular hydroseal center, Archimedean spiral-shaped vertically extending curvilinear plates mounted on the round plate with the arched slots, diverging from the center of the circular hydroseal and bent towards the gas or vapor outlet from the arched slots, an overflow device for the transfer of liquid from the top tray of the column to the bottom one, said device located in the peripheral zone of the round plate and having an overflow pocket and at least one discharge pipe communicating the overflow pocket with the circular hydroseal.

Such a tray is noted for a simple design, low hydraulic resistance and the absence of stagnant zones, this ensuring the reliability of its operation in the presence of solid particles or polymerization products in the liquid. In the course of the tray operation, the liquid flows via discharge pipes to the center of the circular flow-through hydroseal, to the space of the inner ring of the latter, from which the minor portion of the supplied liquid flows over through the gap between the inner ring and tray plate while the remaining, major portion of liquid flows over the upper edge of the inner ring into the gap between the outer and inner rings to fill said latter gap and flow over onto the round plate of the tray through the gap between the outer ring and the tray plate, the inner ring being filled with liquid and the discharge pipe immersed in said liquid, whereby the hydroseal is attained.

However, on ceasing the supply of liquid to the tray, the liquid is fully drained from the circular hydroseal without leaving behind even solid particles or polymerization products. Gas or vapor moves upwards along the column, passes via tangentially directed arched slots and interacts with the liquid flowing from the circular hydroseal in the tray center to yield part of kinetic energy to said liquid, as a result of which a regularly rotational two-phase flow is formed. The liquid performs radial and rotational motion from the center to periphery while gas or vapor performs a helical motion above the tray. The liquid flows from the tray plate to the circular overflow pocket from which it is supplied via discharge pipes to the circular hydroseal of the underlying tray, and so on.

The afore-described prior art tray ensures a close contact between gas or vapor and liquid under conditions of high liquid and gas or vapor loads owing to the organization of an efficient interaction of gas or vapor with liquid in a highly rotational two-phase in a horizontal plane. Following an efficient contact of gas or vapor with liquid, there also takes place their clear separation under the effect of centrifugal forces, as a result of which the liquid is not carried away mechanically at high vapor or gas velocities. The absence of stagnant zones in the through-flow circular hydroseal and the minimum axial agitation of liquid at high velocities of the latter provides a phase flow structure close to the ideal displacement model and makes for higher gradients of concentrations of components distributed between the phases and for an increased motive force of the process, which, in the final analysis, ensures a higher mass transfer efficiency of the tray (Murphree efficiency) at high gas or vapor and liquid loads, i.e., higher gradients of concentrations of components being distributed in gas or vapor and liquid.

However, under conditions of high gas or vapor velocities and a highly rotational two-phase flow, the maximum velocities of elementary volumes of liquid are observed in the peripheral zone of the tray where they reach considerable values, the most intensive interphase mass transfer being known to occur under conditions of high linear velocities of gas or vapor and liquid due to convective diffusion as well as to multiple renewal and expansion of interphase surface. In so doing, in the peripheral zone this process of highly efficient mass transfer in the rotational two-phase flow ceases as a result of the drainage of liquid by gravity to the circular overflow pocket and the reduction of the time of contact of liquid with gas or vapor. In addition, under conditions of very high specific liquid loads on the order of 100 m$^3$/m$^2$h and over, there is required a large number of drainage pipes overlapping the column cross-section and increasing considerably the metal consumption of overflow devices, trays and column as a whole.

SUMMARY OF THE INVENTION

It is an object of the present invention to eliminate the afore-listed disadvantages of prior art designs and develop a novel improved centrifugal-whirling contact tray.

It is another object of the invention to develop a centrifugal-whirling contact tray that would make for an intensified mass transfer between phases in a rotational two-phase flow.

It is still another object of this invention to develop said tray utilizing overflow devices characterized by a low metal consumption.

Said and other objects of the present invention are attained in the centrifugal-whirling contact tray according to the invention.

In a centrifugal-whirling contact tray for use in heat- and mass transfer processes between gas or vapor and liquid, to be installed in mass-transfer columns, comprising a horizontally extending round plate, a circular hydroseal made of two concentric cylindrical rings placed at some distance from the plane of the round plate, said distance increasing towards the outer one of the rings, arched slots for the passage of gas or vapor provided in the round plate outside of the projection of the circular hydroseal and extending towards the periphery, said slots having tangentially directed axes and arranged in concentric circles relative to the center of the circular hydroseal, Archimedean spiral-shaped curvilinear plates vertically mounted on the round plate, diverging from the center of the circular hydroseal and bent towards the gas or vapor outlet from the arched slots, an overflow device for the transfer of liquid from the top tray of the column to the bottom one, said device located in the periphery of the round plate and having an overflow pocket and at least one discharge pipe serving to communicate the overflow pocket with the circular hydroseal, according to the present invention, the overflow pocket is defined by a cylindrical wall, a foundation secured horizontally in the column wall, and two inclined planes symmetrical with respect to a vertical plane extending through the axis of symmetry of the tray round plate, the line of intersection of said planes being directed towards the column axis, and has a cross-section diverging in the direction of flow of liquid being discharged, the center of the circular hydroseal being shifted towards the center of the tray round plate through 0.05–0.1 diameter of the tray whose radius is in the zone of quadrant of its circle located in the direction of two-phase flow rotation after a quadrant accomodating a half of the overflow pocket.

Now, in the herein disclosed centrifugal-whirling contact tray, thanks to the utilization of rotational motion of a two-phase flow in the tray plate under conditions of a radially circular motion of liquid in a horizontal plane from the center to periphery and a helical upward motion of gas or vapor, the gas or vapor velocity is increased by a factor of 1.5–2.5, without a mechanical carryover of liquid, as compared with conventional value and bubble trays. In addition, owing to centrifugal forces developed under conditions of a rotational two-phase flow in a horizontal plane, there takes place a clear separation of liquid from gas or vapor after their contact and, while so doing, a clarified liquid without foam is supplied to the overflow devices and discharge pipes, as a result of which the permissible rate of fluid movement in discharge pipes increases up to 0.5–0.7 m/s, as distinct from bubble trays to whose overflow devices foam is supplied and the permissible rate of fluid movement in their discharge pipes is assumed to be 0.1–0.2 m/s.

Under conditions of two-phase flow rotation in a horizontal plane with a radially circular motion of liquid from the center to periphery at high gas or vapor velocities, there is ensured intensified mass transfer between phases owing to multiple collisions of intersecting jets of gas or vapor and liquid, whereas centrifugal forces thus developed make for the transfer of liquid from the center to periphery. This helps eliminate the gradient of liquid layer height in the direction of its motion and ensures a uniform distribution of liquid, as well as of gas or vapor, over the tray cross-section, which makes for a higher efficiency of mass transfer in the tray (Murphree efficiency). The provision of Archimedean spiral-shaped vertical plates helps attain an additional agitation of gas or vapor and liquid, dispersion of liquid, as well as an expansion and multiple renewal of interphase surface, which results in intensified heat- and mass transfer between phases and higher mass-transfer efficiency of the contact tray. In addition, the Archimedean spiral-shaped curvilinear plates help preclude the wave-making in the rotational two-phase flow, which results in a uniform distribution of phase flows over the tray cross-section and in a higher efficiency of heat- and mass transfer between the phases. The arrangement of the curvilinear plates in the form of Archimedean spiral ensures a constant width of the front of radially diverging rotational liquid flow between adjacent plates, which makes for a uniform distribution of liquid and gas or vapor flows over the tray cross-section and for a higher efficiency of heat- and mass transfer between phases. By varying the dimensions of curvilinear plates (parameters of Archimedean spiral and height of plate), one can predict a preset efficiency of heat- and mass transfer between phases depending upon the ratio of gas or vapor and liquid loads. For example, at very low liquid loads and high vapor velocities (under conditions of vacuum rectification), Archimedean spiral-shaped curvilinear plates of certain parameters serve to increase the time of contact of liquid with vapor, and the mass-transfer efficiency of the contact tray (Murphree efficiency) can be increased by a factor of 1.3–1.5 as compared with a structure having no Archimedean spiral-shaped curvilinear plates.

In another case, at very high specific liquid loads and low vapor velocities (under conditions of extractive rectification), when the kinetic energy of vapor is insufficient for untwisting the liquid, Archimedean spiral-shaped curvilinear plates of certain parameters help attain an additional untwisting of liquid in a horizontal plane, which also makes for its uniform distribution over the tray cross-section and higher efficiency of heat- and mass transfer between vapor and liquid.

In the peripheral zone of the tray plate, the liquid features the maximum circumferential velocity due to kinetic energy of vapor or gas leaving through the arched slots with tangentially directed axes and contacting with the liquid. Since the overflow pocket is located in the peripheral zone of the tray plate, the strongly untwisted liquid in the two-phase flow continues its rotation in the remaining major portion of the peripheral zone of the tray plate while contacting with gas or vapor, thereby increasing the time of contact of liquid with gas or vapor and the efficiency of mass transfer in the tray (Murphree efficiency).

Owing to the provision of a circular hydroseal made of two concentric cylindrical rings placed at some distance from the plane of the tray plate, said distance increasing towards the outer one of the rings, a flow-through hydroseal is formed upon the draining of liquid into the center of circular hydroseal from the discharge pipe outlet since the lower edge of the inner ring is located below the lower edge of the discharge pipe and below the lower edge of the outer ring while the upper edge of the inner ring is located above the lower edge of the discharge pipe and below the upper edge of the outer ring. In so doing, the liquid fills the inner space of the inner ring, part of the liquid passing through the gap between the inner ring and the tray plate. The rest of the liquid flows over the upper edge of the inner ring into the inter-ring space between the inner and outer rings and, via the gap between the outer ring and the tray plate, it is supplied to the tray plate provided with arched slots having tangentially directed axes and arranged in concentric circles with respect to the center of the hydroseal, where the liquid is caused by gas or vapor leaving the arched slots to perform radial and rotational motion in a horizontal plane from the center to periphery while contacting with gas or vapor. At very high liquid loads, part of the liquid may also be transferred from the inter-ring space between the outer and inner rings by flowing over the upper edge of the outer ring onto the tray plate, however, the bulk of liquid retaining its kinetic energy when drained from the discharge pipe will move under the hydroseal rings. In this case, the inner ring will be constantly filled with liquid and the discharge pipe outlet immersed in liquid, i.e., a hydroseal will be provided, the flow-through nature of the hydroseal ensuring the absence therefrom of solid particles or polymerization products. However, upon discontinuation of the supply of liquid via discharge pipe, it will completely drain off the circular hydroseal and the tray plate together with solid particles. Under operating conditions, a considerable part of kinetic energy of liquid flowing from the discharge pipe will be used to increase the velocity of radial motion of liquid on the tray plate, which makes for a reduced gradient of height of the liquid layer on the tray plate and for a more uniform distribution of liquid and gas or vapor over the tray cross-section, this being known to result in a higher mass-transfer efficiency of the contact tray. This advantage is especially pronounced when increasing the mass-transfer efficiency of contact trays of large diameters (3-4 m). The absence of stagnant zones in a flow-through circular hydroseal and on the tray plate is likewise known to promote the increase of the mass-transfer efficiency of the contact tray and the reduction of the liquid residence time on the tray and in the column, which is important under conditions of separation of thermally unstable and polymerizable mixtures.

The afore-described arrangement of the overflow pocket helps utilize a large portion of the peripheral zone of the tray plate for increasing the time of contact of liquid, rotating at high linear velocities, with gas or vapor in order to improve the efficiency of mass transfer between liquid and gas or vapor, as well as shift the discharge pipe inlet communicated with the overflow pocket foundation closer to the discharge pipe outlet located in the central portion of the tray plate, and to expand the area of the flow pocket foundation and the volume of the flow pocket to provide a possibility of expanding the section area of the discharge pipe inlet and increasing the liquid throughout of the overflow devices. The use of a single discharge pipe in overflow devices for the transfer of liquid from the top tray to the bottom one makes for a lower metal consumption of the overflow devices and fuller utilization of the tray plate areas inasmuch as a single discharge pipe takes a smaller area than several discharge pipes under comparable conditions.

It is expedient to provide a separation ring for shaping a two-phase rotational flow, attached to the tray round plate, spaced from the surface of the latter through a distance sufficient for the passage of liquid and arranged concentrically with the circular hydroseal, the height of the separation ring wall exceeding that of the vertical curvilinear plates.

The separation ring provides for the shaping of a rotational two-phase flow at high velocities of gas or vapor about the center of the circular hydroseal and for the phase separation after their contact upon which the bulk of liquid is caused by centrifugal forces to be reflected from the inner walls of the separation ring, flow down and, via gap between the separation ring and the tray plate, be urged by the rotational two-phase flow to flow over to the annular space between the column walls and separation ring to continue rotary motion over the peripheral zone of the tray plate towards the overflow pocket, while gas or vapor separated from liquid performs upward spiral motion to get under the overlying tray. Owing to the provision of the separation ring, high gas or vapor velocities are attained without mechanical carryover of liquid.

It is expedient that the discharge pipe inlet communicated with the overflow pocket foundation be ellipse-shaped in plan, inasmuch as an ellipse has a greater discharge perimeter as compared with a circle of the same area, which makes for a higher liquid throughput of the drainage pipes, lower metal consumption and reduced sectional area of the overflow devices, this resulting in a larger contact area of the tray plate and higher mass-transfer efficiency of the latter.

It is also expedient that the inclined portion of the bend-shaped discharge pipe should have a cross-section diverging in the direction opposite to that of the liquid flow while its vertical portion has a constant area section in the form of a cylinder. Such an arrangement of the discharge pipe will ensure a high throughput thereof inasmuch as a liquid with a lower velocity can be imparted motion in the discharge pipe with the aid a lower velocity head developed owing to a hydrostatic head decreasing upwards over the height of the discharge pipe. In addition, such a design will help reduce the sectional area of overflow devices and, thereby, increase the effective contact area of the tray plate and improve the mass-transfer efficiency of the contact tray.

It is further expedient that the tray be provided with a discharge channel located in the peripheral zone thereof and having a cross-section diverging vertically and radially in the direction of two-phase flow rotation, the liquid inlet section of the channel being located in a zone diametrically opposite to the overflow pocket while the outlet cross-section of the channel communicates with the overflow pocket. Such an arrangement will ensure a uniform distribution of liquid in the peripheral zone of the plate tray, said liquid flowing partly to the discharge channel while its amount increases owing to the flowing off the tray plate in the direction of two-phase flow rotation and consequently, provide for an increased column output, as well as for a uniform distribution of liquid and gas or vapor over the tray plate cross-section to improve the mass-transfer efficiency of the contact tray.

It is likewise expedient that the tray plate, in its zone overlapped by the projection of the circular hydroseal, be provided with arched slots with radially extending axes designed to ensure the passage of gas or vapor through the slots in a radial direction from the center to periphery, this serving to expand the effective surface of contact between liquid and gas or vapor and improve the mass-transfer efficiency of the contact tray, all the more so in view of the fact that the liquid in the gaps between the hydroseal rings and the tray plate also moves in a radial direction from the center to periphery and has a high kinetic energy, and there will take place an ejection of gas or vapor via slots with less pressure difference required to overcome the resistance to the flow of gas or vapor when passing through the slots.

It is expedient that the tray be provided with a vertically extending partition located above the top edge of the side wall of the overflow pocket between the separation ring and the column wall, said vertically extending partition being located above the top edge of the overflow pocket side wall.most remote in the direction of rotation of two-phase flow on the tray plate, the distance from the outer edge of the tray plate and from the separation ring to the vertically extending partition being equal to 0.01-0.1 of the maximum width of the overflow pocket while the height of the vertically extending partition increases in the direction from the separation ring towards the periphery of the tray plate, the average height of the partition being 0.05-0.1 tray diameter.

The vertical partition helps reflect the rotational flow of liquid over the overflow pocket and direct said liquid to the overflow pocket under conditions of very high liquid loads on the order of 100 m$^3$/m$^2$n and over, as a result of which an additional layer of liquid is formed above the overflow pocket by the effect of the velocity head of rotational two-phase flow, said layer, in its turn, making for a higher velocity of liquid in the overflow devices of the tray and for a higher liquid throughput of said devices. In addition, the vertical partition keeps the liquid from getting onto the tray plate from the overflow pocket, which would be equivalent to the countermixing of liquid affecting the motive force of the process and the mass-transfer efficiency of the tray. More-over, a higher mass-transfer efficiency of the contact tray is attained thanks to an increase of the useful area of the tray plate owing to a reduced sectional area of the overflow devices.

It is expedient that a horizontally extending reflecting disk be mounted on the discharge pipe above the circular hydroseal in the direction of liquid flow, said disk having the same diameter as the outer ring of the circular hydroseal and serving to direct downwards to the circular hydroseal the liquid moving upwards upon an impact against the tray plate following the outlet from the discharge pipe and prevent said liquid from spraying and being mechanically carried to the overlying tray.

It is also expedient that the smaller portion of the inlet cross-section of the overflow pocket, located closer to the tray center, be overlapped by a plate attached to the side walls of the overflow pocket and having arched slots whose size and position fully coincide with those of the arched slots provided in the tray round plate. Such a solution makes for a more uniform distribution of liquid in the zone of the overflow pocket inasmuch as said plate with arched slots serves to increase the path of liquid movement on the tray plate, which results, as is known, in an improved efficiency of mass transfer in the contact tray. In addition, gas or vapor from the overflow pocket is sucked off via slots in the plate due to ejection to improve the operating conditions of the overflow devices, i.e., increase their throughout, under conditions of high liquid loads.

It is further expedient that the overflow pocket be partly closed on the periphery thereof with a plate attached to the side walls of the overflow pocket and having arched slots whose size and position coincide with those of the arched slots provided in the tray plate. Such a solution makes for the recirculation of some part of liquid in the peripheral area of the tray plate, said liquid being caused by centrifugal forces and forces of inertia to flow over the plate above the overflow pocket in the peripheral portion thereof and resume rotational motion in the peripheral portion of the tray plate, thereby making for an increased height of the liquid layer on the tray and, consequently, for a longer time of contact between gas or vapor and liquid and a higher mass-transfer efficiency of the contact tray under conditions of very low liquid loads and very high gas or vapor velocities (under conditions of vacuum rectification). Gas or vapor is also drawn off from the overflow pocket via arched slots in the plate overlapping the overflow pocket, due to ejection by a flow of liquid moving at a high velocity over the surface of the plate with arched slots.

BRIEF DESCRIPTION OF THE DRAWINGS

The present invention will be more apparent upon considering the following detailed description of an exemplary embodiment thereof, with due reference to the accompanying drawings, in which.

DETAILED DESCRIPTION OF THE DRAWINGS

Figure 2:
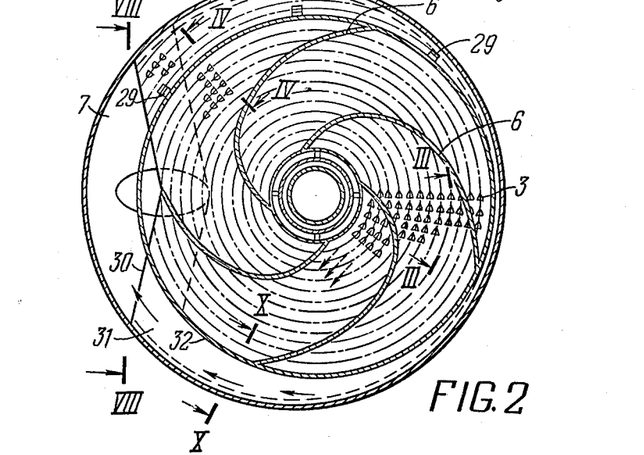
FIG. 2 is a section taken on the line II—II of FIG. 1.
Figures 3, 4, 5:
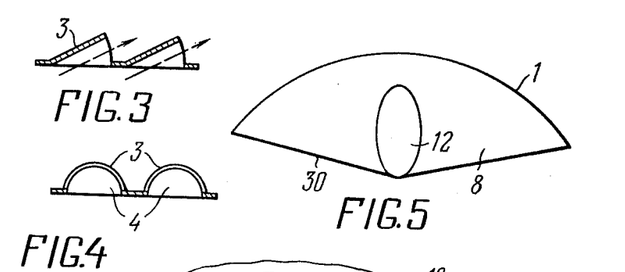
FIG. 3 is a section taken on the line III—III of FIG. 2.
FIG. 4 is a section taken on the line IV—IV of FIG. 2.
FIG. 5 is a section taken on the line V—V of FIG. 1, on an enlarged scale.

Referring now to the accompanying drawings, a column 1 has centrifugal-whirling contact trays mounted one above another, each one of said trays comprising a horizontally extending round plate 2 (FIGS. 1, 2) with arched slots 3 for the passage of gas or vapor whose axes 4 (FIGS. 3, 4) are directed tangentially to the center of a hydroseal 5 and inclined at some angle to the plane of the round plate 2. The arched slots 3 are arranged in concentric circles about the center of the circular hydroseal 5. The tray further comprises vertically extending curvilinear plates 6 in the form of Archimedean spiral, mounted on the tray plate 2 with arched slots 3, diverging from the center of the circular hydroseal 5 and bent towards the gas or vapor outlet from the arched slots 3 with axes 4, and an overflow device for the transfer of liquid from the top tray of the column 1 to the bottom one, said device located on the periphery of the plate 2 and having an overflow pocket 7 with a cross-section diverging downwards in the direction of liquid flow and a bottom foundation 8 (FIG. 5), said overflow device further including a discharge pipe 9 fashioned as a bend with an inclined portion 10 diverging downwards in a direction opposite to that of liquid flow, a vertical, say, cylindrical portion 11, an ellipse-shaped inlet 12 and an outlet 13 for draining liquid from the overflow pocket 7 to the center of the circular hydroseal 5 of the underlying tray. Provided between the lower edge of the cylindrical portion 11 of the discharge pipe 9 and the plane of the tray plate 2 is a gap 14 for the passage of liquid. A separation ring 15 is mounted above the plate 2 concentrically with the center of the circular hydroseal 5 and with the axis of the cylindrical portion 11 of the discharge pipe 9. A gap 16 for the passage of liquid is provided between a lower edge 17 of the separation ring 15 and the plane of the tray plate 2. The circular hydroseal 5 is made up of two rings, an inner ring 18 and an outer ring 19 (FIGS. 6, 7), arranged concentrically with respect to the cylindrical portion 11 of the discharge pipe 9. A gap 20 is provided between a lower edge 21 of the inner ring 18 and the plane of the plate 2, while a gap 22 is provided for the passage of liquid between a lower edge 23 of the outer ring 19 and the plane of the plate 2, the lower edge 21 of the inner ring 18 being located below edge of the cylindrical portion 11 of the drainage pipe 9 and below the lower edge 23 of the outer ring 19 whereas an upper edge 24 of the inner ring 18 is located above the lower edge of the cylindrical portion 11 of the discharge pipe 9 and below an upper edge 25 of the outer ring 19. Positioned above the rings 18 and 19 (FIG. 1) at some distance from the ring 19 is a horizontally extending reflecting disk 26 attached to the cylindrical portion 11 of the discharge pipe 9. The reflecting disk 26 has an outer diameter equal to the diameter of the outer ring 19. The rings 18 and 19 are rigidly attached to each other by plates 27 (FIGS. 6, 7) and to the plate 2 by rods 28, while the separation ring 15 (FIG. 2) is attached to the plate 2 by means of brackets 29.

The overflow pocket 7 (FIGS. 5, 8) is defined by the body of the column 1, bottom foundation 8 and two inclined side walls 30. Mounted on the topmost tray is a vertically extending pipe with the circular hydroseal 5 for the supply of liquid (not shown in the drawings) while the branch pipes designed for the supply of liquid to intermediate trays are located in the body of the column 1 directly opposite the overflow pockets 7 (not shown in the drawings). The center of the circular hydroseal 5 is shifted with respect to the center of the tray round plate 2 through 0.05–0.1 tray diameter along the radius of the tray round plate 2. In so doing, the radius lies in the zone of quadrant of the circle of the tray plate 2 located in the direction of rotation of two-phase flow on the tray after the quadrant accommodating a half of the overflow pocket 7.

Figures 7, 8, 9:
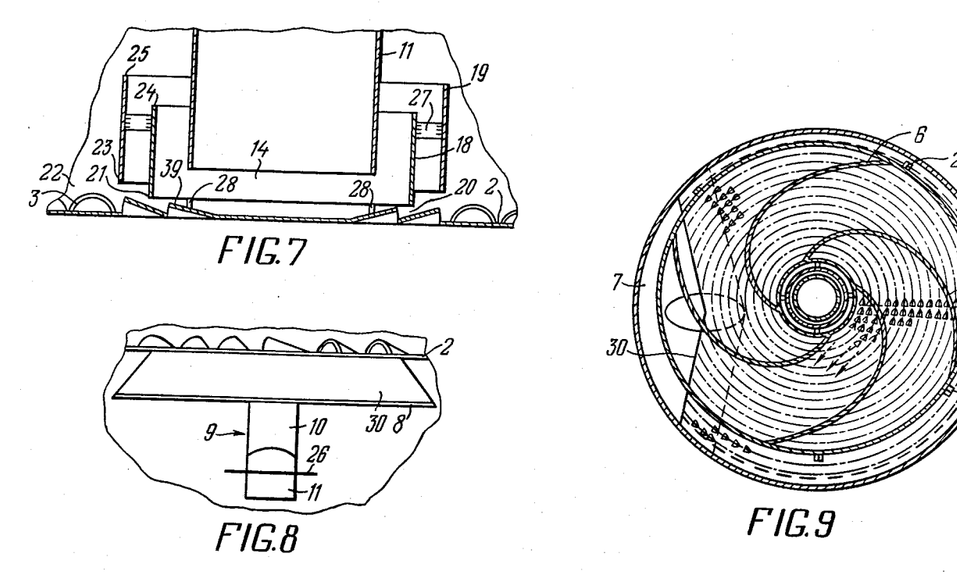
FIG. 7 is a section taken on the line VII—VII of FIG. 6.
FIG. 8 is a section taken on the line VIII—VIII of FIG. 2.
FIG. 9 is a plan view of the herein disclosed tray, with the center of the circular hydroseal shifted with respect to the center of the tray plate on a normal to the axis of symmetry of the overflow pocket in the direction of the beginning of rotary motion of the two-phase flow on the tray away from the overflow pocket, according to the invention.

The radius along which the center of the circular hydroseal 5 is shifted with respect to the center of the tray plate 2 may take two extreme positions, namely, the center of the circular hydroseal 5 can be shifted with respect to the center of the tray plate 2 in a direction away from the overflow pocket 7 (FIG. 2), or the center of the circular hydroseal can be shifted with respect to the center of the tray plate 2 normal to the axis of symmetry of the overflow pocket 7 towards the beginning of rotary motion of two-phase flow on the tray away from the overflow pocket 7 (FIG. 9). In fact, depending upon actual conditions, the radius along which the center of the circular hydroseal 5 is shifted with respect to the center of the tray plate 2 can take any intermediate position between two extreme positions shown in FIGS. 2 and 9.

Figure 10:
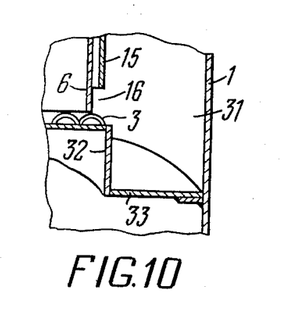
FIG. 10 is a section taken on the line X—X of FIG. 2.

For the conditions of the tray operation at very high specific liquid loads, a discharge channel 31 (FIG. 2) is provided in the peripheral zone of the tray plate 2, said channel having a cross-section diverging vertically and radially in the direction of rotation of the two-phase flow on the tray. The liquid inlet cross-section of the channel 31 is located in a zone diametrically opposite from the overflow pocket 7 while the outlet cross-section of the discharge channel 31 communicates with the overflow pocket 7. The discharge channel 31 is defined on one peripheral side by the wall of the column 1 and on the other side—by a side wall 32 (FIG. 10) and by a foundation 33 inclined in the direction of rotation of the two-phase flow on the tray such that the cross-section of the discharge channel 31 increases thanks to the inclination of the foundation 33 and the increase of the channel width in the direction of rotation of the two-phase flow on the tray. A minor portion of the inlet section of the overflow pocket 7 located closer to the tray center is overlapped by a plate 34 (FIG. 11) attached to the side walls 30 (FIG. 11) of the overflow pocket 7 and having arched slots 35 (FIG. 12) whose dimensions and position with regard to the concentric circles and tangential direction of the axes 4 fully coincide with the arched slots 3 provided in the tray plate 2.

Figure 13:
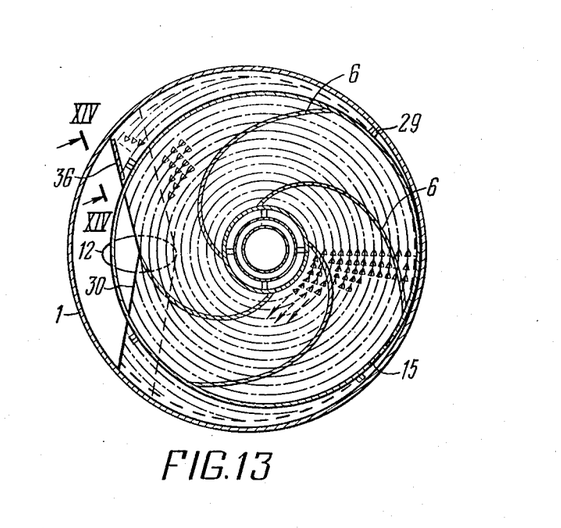
FIG. 13 is a plan view of the herein disclosed tray having a vertically extending partition, according to the invention.
Figure 15:
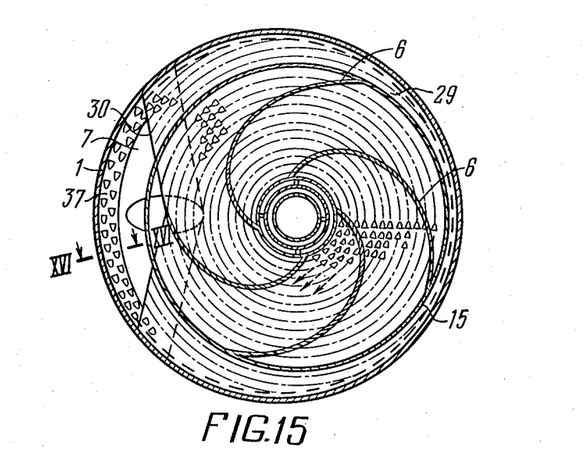
FIG. 15 is a plan view of the herein disclosed tray having a plate attached to the side walls of the overflow pocket and partly overlapping the overflow pocket in the peripheral portion of the tray near the column wall, according to the invention.
Figure 16:
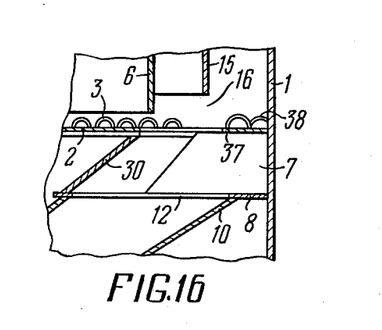
FIG. 16 is a section taken on the line XVI—XVI of FIG. 15.

For the conditions of the tray operation at very high liquid loads, provided above the upper edge of the side wall 30 of the overflow pocket 7, most remote in the direction of rotation of the two-phase flow on the tray, is a vertically extending partition 36 (FIG. 13) attached to the tray plate 2 and removed from the separation ring 15 and from the wall of the column 1 through 0.01–0.1 of the maximum width of the overflow pocket 7. The height of the vertical partition 36 increases in the direction from the separation ring 15 towards the periphery of the tray plate 2 while the average height of the partition is 0.05–0.1 tray diameter. In the peripheral zone near the wall of the column 1, the overflow pocket 7 is partly closed by a plate 37 (FIGS. 15, 16) attached to the side walls 30 of the overflow pocket 7, said plate 37 having arched slots 38 whose dimensions and position with regard to concentric circles and tangential direction of the axes 4 coincide with those of the arched slots 3 provided in the tray plate 2.

Figure 17:
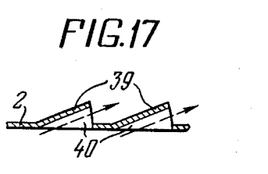
FIG. 17 is a section taken on the line XVII—XVII of FIG. 6.
Figure 18:
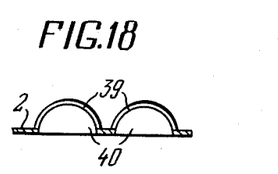
FIG. 18 is a section taken on the line XVIII—XVIII of FIG. 6.

Provided in the tray plate 2, in the zone overlapped by the projection of the circular hydroseal 5, are arched slots 39 (FIG. 6) with radially directed axes 40 (FIGS. 17, 18), said slots being arranged at some angle to the plane of the plate 2 ensuring the passage of gas or vapor through the arched slots 39 from the center to the periphery of the tray plate 2.

The herein described centrifugal-whirling contact trays mounted in the column one above the other operate in the following manner.

Gas or vapor moves upwards along the column to the underside of the tray plates 2 (FIG. 1) and passes through the arched slots 3 (FIGS. 2, 3, 4) with tangentially directed axes 4, as a result of which there is formed on each one of the trays (FIG. 2) a regularly rotating gas or vapor flow which entrains liquid flowing from the circular hydroseal 5 (FIGS. 6, 7) and yields part of its kinetic energy to said liquid. As a result, a regularly rotating two-phase flow is formed on the tray plate 2 (FIG. 2). Part of gas or vapor also passes through the arched slots 39 (FIGS. 6, 17, 18) with radially directed axes 40, gets entrained by liquid flowing from the discharge pipe 9 and comes to the tray plate 2 having arched slots 3 with tangentially directed axes 4. The utilization of the area of the tray plate 2 in the zone beneath the circular hydroseal 5 leads to a larger contact area of the tray and interphase surface of mass transfer, this resulting in a higher mass-transfer efficiency of the tray at high specific liquid loads of the order of 100 m³/m²h and more.

Figure 1:
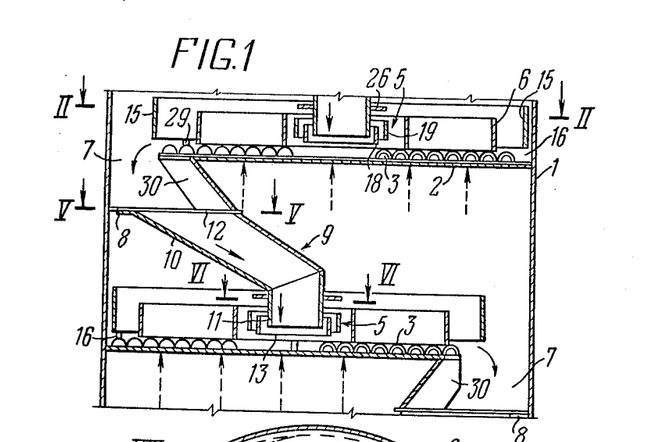
FIG. 1 is a side elevation of part of a column with centrifugal-whirling contact trays in which the center of a circular hydroseal is shifted relative to the center of the tray plate away from the overflow pocket, according to the invention.
Figure 6:
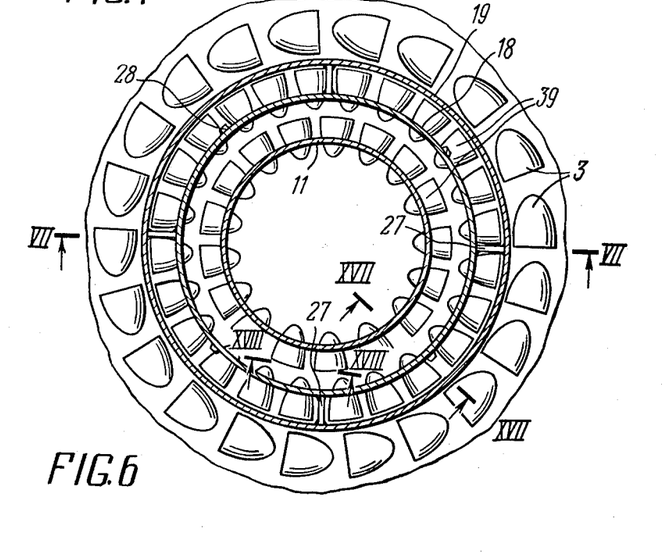
FIG. 6 is a section taken on the line VI—VI of FIG. 1, on an enlarged scale.

Liquid flows into the circular hydroseal 5 via discharge pipe 9 to till the inner space of the inner ring 18 (FIGS. 1, 6, 7). Part of this liquid (one-half) passes through the annular gap 20 between the lower edge 21 of the inner ring 18 and the plane of the plate 2 while the rest of liquid flows over the upper edge 24 of the inner ring 18 and into the inter-ring space between the rings 19 and 18 or, after being reflected from the reflecting disk 26, likewise gets to the inter-ring space between the rings 19 and 18 and, via gap 22 between the lower edge 23 of the outer ring 19 and the plane of the plate 2, flows onto the tray plate 2 provided with the arched slots 3 having tangentially directed axes 4. In so doing, liquid performs radial and rotational motion in a horizontal plane from the center of the circular hydroseal 5 towards the periphery of the tray plate 2, while gas or vapor performs spiral motion towards the underside of the overlying tray, and so on. In this manner, under the operating conditions involving the drainage of liquid from the discharge pipe 9 to the circular hydroseal 5, the inner ring 18 will be filled with liquid and the outlet 13 of the cylindrical portion 11 of the discharge pipe 9 will be sunk in liquid, i.e., a hydroseal will be ensured. However, when the supply of liquid to the tray is discontinued, all of the liquid leaves the circular hydroseal 5 and the tray plate 2 without leaving behind solid particles or polymerization products.

The rotational two-phase flow is reflected from the Archimedean spiral-shaped curvilinear plates 6 (FIG. 2), which results in additional turbulization of the gas or vapor flow, cross collisions of elementary volumes of gas or vapor and liquid, dispersion of liquid, multiple renewal and expansion of the interphase surface, this leading to intensified mass transfer in the phases and higher mass-transfer efficiency of the contact tray (Murphree efficiency). The separation ring 15 serves to restrict the regularly rotating two-phase flow on the tray plate 2. On having performed, under the effect of centrifugal forces, radial and rotational motion in a horizontal plane from the center of the circular hydroseal 5 towards the periphery, i.e., to the walls of the separation ring 15, liquid flows via the gap 16 between the lower edge 17 of the separation ring 15 and tray plate 2 to the peripheral portion of the tray plate 2, where it continues rotational motion near the wall of the column 1 under the effect of cross impacts by gas or vapor moving upwards. This results in the formation of an additional highly turbulized interphase surface over the greater part of perimeter of the tray plate 2 inasmuch as the overflow pocket 7 takes a considerably smaller portion of the perimeter of the tray plate 2 although some partial interaction of the rotational two-phase flow with gas or vapor takes place over the overflow pocket 7 as well, which makes for a further increase of the mass-transfer efficiency of the contact tray. Part of liquid colliding against the inner walls of the separation ring 15 flows downwards and also gets to the peripheral portion of the plate 2 via gap 16, while gas or vapor separates from liquid to perform upward helical motion. Thanks to the provision of the separation ring 15, an increase of the gas or vapor velocity can be attained without mechanical carry-over of liquid.

Owing to the shifting of the center of the circular hydroseal 5 with respect to the center of the tray plate 2 (FIGS. 1, 2) with an increase of the height of the liquid layer in the peripheral portion of the tray plate 2 in view of a constant growth of its amount in the direction of rotation of the two-phase flow over the perimeter of the tray plate 2 as a result of radial and rotational motion of liquid from the center of the circular hydroseal 5 towards the periphery, there expands the annular space between the wall of the column 1 and the separation ring 15, in which space the liquid is pushed by gas or vapor leaving the slots 3 to move in the direction of the overflow pocket 7. While so doing, the height of the liquid layer in said space may exceed considerably the value of the gap 16 between the lower edge 17 of the separation ring 15 and the tray plate 2, especially so, under conditions of high specific liquid loads of the order of 100 m²/m²h and more. Therefore, the setting up of a space between the wall of the column 1 and the separation ring 15 with a cross-section diverging in the direction of rotation of the two-phase flow on the tray plate 2 by shifting the circular hydroseal with respect to the center of the tray plate 2 provides for the drainage of liquid from the tray with simultaneous efficient mass transfer of liquid with gas or vapor in the peripheral portion of the tray. This does not affect the mode of intense rotation of the two-phase flow on the plate 2 inside the separation ring 15 at high velocities of gas or vapor and liquid, whish helps ensure high gas or vapor and liquid loads and a high mass-transfer efficiency of the contact tray (Murphree efficiency). Under conditions of very high specific liquid loads on the order of 100 m³/m²h and over and large tray diameters, liquid loads on the draining perimeter of the tray plate 2 increase considerably. It is for such conditions that there is provided the discharge channel 31 (FIGS. 2, 10) defined by the wall of the column 1, the side wall 32 and foundation 33, said channel having a cross-section diverging in the direction of rotation of the two-phase flow on the tray; the liquid inlet cross-section of the channel is located in a zone diametrically opposite from the overflow pocket 7 where there is observed a considerable increase in the amount of liquid flowing from the tray plate 2. Because of an inclination of the foundation 33 of the discharge channel 31 in the direction of the overflow pocket 7, the liquid still having kinetic energy imparted to it by the rotational two-phase flow flows at a high velocity into the segmentary overflow pocket 7 while separating from gas or vapor. Therefore, flowing to the overflow pocket 7 and to the discharge pipes 9 (FIGS. 1, 2) is deaerated liquid without gas or vapor and, consequently, the permissible rate of liquid motion in the discharge pipes 9 can be assumed to be 0.5-0.7 lit/s, which enables one to increase the capacity of the overflow devices or reduce their sectional area and metal consumption, thereby expanding the useful contact area of the trays and, as a result, increasing the output and mass-transfer efficiency of the trays. The cross-section of the overflow pocket 7 diverging downwards in the direction of liquid flow makes for an expansion of the foundation 8 for expanding the ellipse-shaped inlet 12 of the inclined portion 10 (diverging upwards) of the discharge pipe 9, said latter expansion making for an increased liquid throughput of the overflow devices. In addition, an expansion of the width of the bottom foundation 8 of the overflow pocket 7 further helps ensure the shifting of the inlet 12 of the discharge pipe 9 towards the outlet 13 of the vertically extending portion 11 of the discharge pipe 9, located in the center of the circular hydroseal 5 of the underlying tray, which facilitates structurally the shifting of the inlet 12 of the discharge pipe 9 with the aid of an elbow junction.

From the overflow pocket 7, liquid flows via discharge pipe 9 to the center of the circular hydroseal 5 of the underlying tray, and so on.

Figure 14:
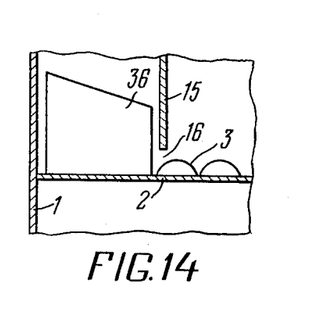
FIG. 14 is a section taken on the line XIV—XIV of FIG. 13.

Under conditions of very high liquid loads of the order of 100 m³/m²h and more, the provision of the vertically extending partition 36 (FIGS. 13, 14) mounted above the upper edge of the side wall 30 of the overflow pocket 7, most remote in the direction of rotation of the two-phase flow on the tray plate 2, makes for an increase of the hydrostatic liquid column over the overflow pocket 7, which, in turn, provides for an increase of the rate of liquid motion in the overflow devices and for an increase of their liquid throughput. The increase of the hydrostatic liquid column is attained owing to the transformation of kinetic energy of the rotational flow of liquid in the peripheral portion of the tray plate 2 upon being drained to the overflow pocket 7 and reflected from the partition 36, said increase of the hydrostatic liquid column being capable of bringing liquid up to the average height of the vertical partition 36 at high liquid and gas or vapor loads.

Under conditions of very high liquid loads, the provision of the plate 34 (FIGS. 11, 12) overlapping the minor portion of the inlet cross-section of the overflow pocket 7, located closer to the center of the tray plate 2, and having arched slots 35 whose dimensions and position with regard to the concentric circles and tangential direction of the axes 4 coincide with those of the arched slots 3 provided in the tray plate 2, helps increase the time of contact of liquid with gas or vapor on the tray plate 2 in the zone of location of the overflow pocket 7, which, in turn, makes for an increase in the mass-transfer efficiency of the contact tray. In addition, there occurs the ejection of gas or vapor from the segmentary overflow pocket 7 via slots 3, which serves to improve the operating conditions of the overflow devices owing to separation of gas or vapor from liquid.

Figure 11:
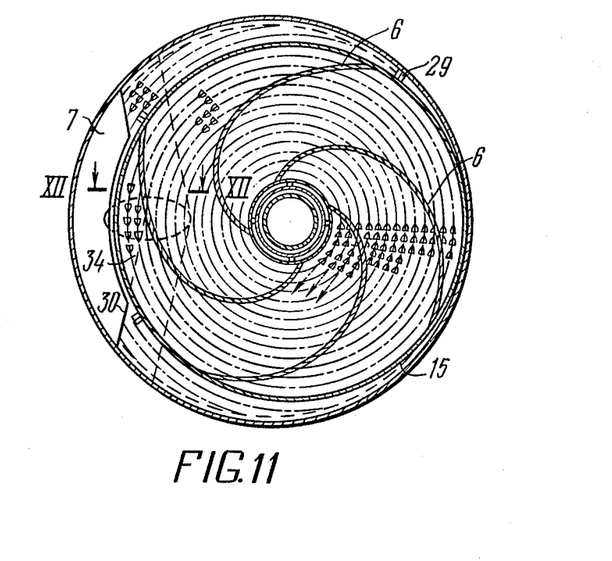
FIG. 11 is a plan view of the herein disclosed tray with a plate attached to the side walls of the overflow pocket and located closer to the tray center, according to the invention.
Figure 12:
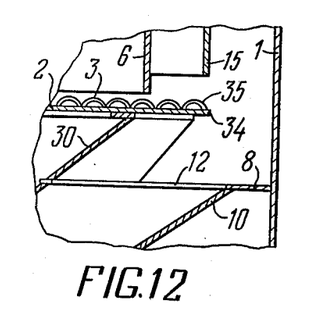
FIG. 12 is a section taken on the line XII—XII of FIG. 11.

As is seen, the provision of the plate 34 makes for an increased throughput of the overflow devices and higher mass-transfer efficiency of the contact tray by increasing the time of contact of liquid with gas or vapor, since the liquid from the overflow pocket 7 ejects gas or vapor with which it comes in contact and, prior to getting onto the plate 34, said liquid performs rotational motion on the tray plate 2 together with gas or vapor which partly stayed with liquid.

Therefore, the shifting of the center of the circular hydroseal 5 with respect to the center of the tray, the use of one-sided position of the overflow pocket 7 on the tray for prolonging the time of contact of liquid with gas or vapor in the peripheral portion of the tray, the use of the discharge channel 31 of diverging cross-section in the peripheral portion of the tray and of the vertically extending partition 36 for increasing the hydrostatic head of liquid under the overflow pocket 7, as well as the establishment of the contact of gas or vapor with liquid in the zone of the tray plate 2 below the circular hydroseal 5 and in the zone of the overflow pocket 7, in combination with the use of rational phase interaction owing to tangential injection of gas or vapor into liquid and the resulting organization of a rotational two-phase flow in the presence of the Archimedean spiral-shaped curvilinear plates 6 on the tray and in the presence of the flow-through circular hydroseal 5, all help to ensure high hydrodynamic parameters of the centrifugal-whirling contact tray of the invention, namely, a high gas or vapor capacity expressed in terms of the velocity coefficient of over 3.3 for the full cross-section of the column and liquid capacity of the order of 100 m³/m²h and more, low hydraulic resistance which is 1.5-2.5 times lower than that of modern valve and bubble trays under comparable conditions. The hydrodynamic structure of phase flows, close to the ideal displacement model, ensures a high and stable mass-transfer efficiency of the centrifugal-whirling contact tray (Murphree efficiency) over a wide range of variation of gas or vapor and liquid loads. In addition, the use of single-pipe overflow devices, in spite of some complications in manufacturing overflow pockets and below portions of discharge pipes, makes for a considerable reduction of the amount of metal required for manufacturing the trays, which offer a considerable advantage in the case of columns having diameters of up to 3-4 m under conditions of operation at very high specific liquid loads of over 100 m³/m²h characteristic of the conditions of extractive rectification and gas separation at very high pressures.

The use of Archimedean spiral-shaped vertical curvilinear plates 6 mounted on a contact tray with rotational two-phase flow helps considerably improve the flexibility of operation of centrifugal-whirling contact trays. By varying the parameters of Archimedean spiral, one can predict a preset hydrodynamic pattern and mass-transfer efficiency (Murphree efficiency) for the conditions of both high and low liquid loads. In particular, for increasing the mass-transfer efficiency at very low liquid loads and high volume velocities of gas or vapor under conditions of vacuum rectification, in the centrifugal-whirling contact tray use is made of the plate 34 (FIG. 15) attached to the side walls 30 of the overflow pocket 7 and overlapping the latter partly in the peripheral portion near the wall of the column 1, over which part of liquid is caused by high velocities and centrifugal forces to flow to the tray plate 2 for multiple contacts with gas or vapor in the peripheral portion of the tray plate 2. Owing to this, the height of the liquid layer on the tray increases, as well as the average time of contact of gas or vapor with liquid, which, under conditions of, say, vacuum rectification, makes for a sharp increase of the mass-transfer efficiency of the content tray (Murphree efficiency).

The use of the herein disclosed centrifugal-whirling contact tray in rectification and absorption columns ensures a high capacity of the latter with respect to gas or vapor and liquid, as well as a high efficiency of mass transfer and low metal consumption of the structure, thereby providing for a higher purity of products being separated and for a reduced cost price of said products.

What is claimed is:

1. A centrifugal-whirling contact tray for use in heat- and mass transfer processes between gas or vapor and liquid, to be installed in the body of a mass-transfer column, said tray comprising:
   a round plate arranged horizontally in said body of a mass-transfer column;
   a circular hydroseal made up of two concentric cylindrical rings, an outer one and an inner one, placed at some distance from the plate of said round plate, said distance increasing towards said outer ring;
   arched slots for the passage of gas or vapor provided said round plate outside of the projection of said circular hydroseal and extending towards the periphery, said slots having tangentially directed axes and arranged in concentric circles relative to the center of said circular hydroseal;

Archimedean spiral-shaped curvilinear plates vertically mounted on said round plate, diverging from the center of said circular hydroseal and bent towards the gas or vapor outlet from said arched slots;

an overflow device for the transfer of liquid from the top tray of the column to the bottom one, said device located in the peripheral zone of said round plate and including an overflow pocket and at least one discharge pipe serving to communicate said overflow pocket with said circular hydroseal;

said overflow pocket being defined by a foundation secured horizontally in the column wall, a cylindrical wall and two inclined planes symmetrical with respect to a vertical plane extending through the axis of symmetry of said round plate of the tray, the line of intersection of said planes being directed towards the column axis, said overflow pocket further having a cross-section diverging in the direction of flow of liquid being discharged, the center of said circular hydroseal being shifted with respect to the center of said round plate of the tray through 0.05–0.1 diameter of the tray whose radius lies in the zone of quadrant of its circle located in the direction of two-phase flow rotation after a quadrant accomodating a half of the overflow pocket.

2. A centrifugal-whirling contact tray as set forth in claim 1, wherein provision is made of a separation ring for shaping a two-phase rotational flow, attached to the tray round plate, spaced from the surface of said round plate through a distance sufficient for the passage of liquid and placed concentrically with the circular hydroseal, the height of the separation ring wall exceeding that of the vertical curvilinear plates.

3. A centrifugal-whirling contact tray as set forth in claim 1, wherein the discharge pipe is fashioned as a bend whose inclined portion has a cross-section diverging in a direction opposite to that of the liquid flow while its vertical portion has a constant area section.

4. A centrifugal-whirling contact tray as set forth in claim 3, wherein the discharge pipe inlet is ellipse-shaped in plan.

5. A centrifugal-whirling contact tray as set forth in claim 1, provided with a discharge channel located in the peripheral zone thereof and having a cross-section diverging vertically and radially in the direction of two-phase flow rotation, the liquid inlet cross-section of the channel being located in a zone diametrically opposite from the overflow pocket while the outlet cross-section of the channel communicates with the overflow pocket.

6. A centrifugal-whirling contact tray as set forth in claim 1, provided in the tray plate, in its zone overlapped by the projection of the circular hydroseal, with arched slots having radially extending axes designed to ensure the passage of gas or vapor from the center to periphery.

7. A centrifugal-whirling contact tray as set forth in claim 6, wherein the smaller portion of the inlet cross-section of the overflow pocket, located closer to the center of the tray, is overlapped by a plate attached to the overflow pocket wall and having arched slots whose size and position fully coincide with those of the arched slots provided in the tray round plate.

8. A centrifugal-whirling contact tray as set forth in claim 6, wherein the overflow pocket is partly closed on the periphery thereof with a plate attached to the overflow pocket wall and having arched slots whose size and position coincide with those of the arched slots provided in the tray round plate.

9. A centrifugal-whirling contact tray as set forth in claim 1, provided with a partition attached vertically to the round plate, the height of said partition increasing in the direction from the separation ring towards the periphery of the round plate while the average height of the partition is 0.05–0.1 diameter of the round plate, said partition being located above the top edge of the overflow pocket wall between the separation ring and the column wall most remote in the direction of rotation of two-phase flow on the tray round plate, the distance from the edge of the tray round plate and from the separation ring to the vertical partition being equal to 0.01–0.1 of the maximum width of the overflow pocket.

10. A centrifugal-whirling contact tray as set forth in claim 1, wherein there is mounted on the discharge pipe above the circular hydroseal in the direction of liquid flow a horizontally extending reflecting disk having the same diameter as the outer ring of the circular hydroseal, said disk serving to direct downwards to the circular hydroseal the liquid moving upwards upon an impact against the tray round plate following the outlet from the discharge pipe and prevent said liquid from spraying and from being mechanically carried away to the overlying tray.

11. A centrifugal-whirling contact tray as set forth in claim 1, wherein the smaller portion of the inlet cross-section of the overflow pocket, located closer to the center of the tray, is overlapped by a plate attached to the side walls of the overflow pocket and having arched slots whose size and position fully coincide with those of the arched slots provided in the tray round plate.

12. A centrifugal-whirling contact tray as set forth in claim 1, wherein the overflow pocket is partly closed on the periphery thereof with a plate attached to the overflow pocket wall and having arched slots whose size and position coincide with those of the arched slots provided in the tray round plate.

* * * * *